United States Patent
Carlson

[11] Patent Number: 5,367,857
[45] Date of Patent: Nov. 29, 1994

[54] METHOD AND DEVICE FOR COMPACTING FEEDSTUFF OR THE LIKE IN A TUBE TO BE PLACED ON THE GROUND

[75] Inventor: Stig Carlson, Malmö, Sweden

[73] Assignee: Sockerbolaget AB, Malmo, Sweden

[21] Appl. No.: 30,347

[22] PCT Filed: Sep. 26, 1991

[86] PCT No.: PCT/SE91/00648
§ 371 Date: Mar. 25, 1993
§ 102(e) Date: Mar. 25, 1993

[87] PCT Pub. No.: WO92/05688
PCT Pub. Date: Apr. 16, 1992

[30] Foreign Application Priority Data

Sep. 27, 1990 [SE] Sweden .................. 9003084-2

[51] Int. Cl.[5] .................................. B65B 1/24
[52] U.S. Cl. .................................. 53/436; 53/439; 53/459; 53/523; 53/529; 53/567; 53/576; 100/50; 100/100; 100/145; 141/12; 141/71
[58] Field of Search .............. 100/100, 50, 145; 141/114, 231, 256, 12, 71; 53/436, 439, 459, 469, 473, 523, 529, 567, 570, 576, 530; 198/670, 674, 675

[56] References Cited

U.S. PATENT DOCUMENTS

| | | | |
|---|---|---|---|
| 3,687,061 | 8/1972 | Eggenmuller et al. | 53/576 X |
| 4,185,446 | 1/1980 | Clostermeyer et al. | 100/50 X |
| 4,256,031 | 3/1981 | Ryan | 100/65 |
| 4,337,805 | 7/1982 | Johnson et al. | 53/576 X |
| 4,484,606 | 11/1984 | Kosters | 141/114 |
| 4,567,820 | 2/1986 | Munsell | 53/576 X |
| 4,621,666 | 11/1986 | Ryan | 53/576 X |
| 4,653,553 | 3/1987 | Cox et al. | 141/114 |
| 4,655,128 | 4/1987 | St. Clair | 100/145 |
| 4,672,794 | 6/1987 | Good | 53/459 X |
| 4,724,876 | 2/1988 | Ryan . | |
| 4,747,343 | 5/1988 | St. Clair | 100/145 |
| 4,750,418 | 6/1988 | Naaktgeboren | 100/50 |
| 4,763,702 | 8/1988 | High, Jr. et al. | 141/256 X |
| 4,949,633 | 8/1990 | Johnson et al. | 100/100 X |
| 5,140,802 | 8/1992 | Inman et al. | 53/459 |
| 5,178,061 | 1/1993 | Alonso-Amelot | 100/100 X |
| 5,213,143 | 5/1993 | Policky et al. | 100/100 X |

FOREIGN PATENT DOCUMENTS 1954850 5/1971 Germany .
WO92/16413 10/1992 WIPO .

*Primary Examiner*—John Sipos
*Assistant Examiner*—Daniel Moon
*Attorney, Agent, or Firm*—Beveridge, DeGrandi, Weilacher & Young

[57] ABSTRACT

Feedstuff is compacted in a tube which lies on the ground by a mobile device which includes a traction vehicle, a trailer unit, and a rotatable feeding screw mounted at the rear of the trailer unit for feeding feedstuff from a container into the tube where it is compacted. The screw is rotated by a hydraulic motor which is driven by hydraulic fluid at a pressure which is proportional to loading of the feeding screw due to compaction of feedstuff by the screw. A brake system brakes the wheels of the trailer unit to produce a braking force while the feedstuff is being fed into the tube. A control unit controls the brake system in response to signals from a transducer which senses the hydraulic pressure at the motor. The braking force is reduced when the sensed hydraulic pressure rises to a predetermined maximum value, and the braking force is increased when the sensed hydraulic pressure decreases to a predetermined minimum value.

5 Claims, 3 Drawing Sheets

METHOD AND DEVICE FOR COMPACTING FEEDSTUFF OR THE LIKE IN A TUBE TO BE PLACED ON THE GROUND

BACKGROUND OF THE INVENTION

The present invention relates to a method and a device for compacting feedstuff or the like in a tube to be placed on the ground as the mobile device is propelled.

The device includes a traction vehicle, a trailer unit connected to the traction vehicle, a container for the feedstuff, and a rotatable feeding screw mounted at the rear of the trailer unit for feeding the feedstuff from the container into the tube where it is compacted. The device has a brake system for braking the wheels of the trailer unit to produce a braking force while the feedstuff is being fed into the tube.

U.S. Pat. No. 4,949,633 discloses such a mobile device, which may serve as an example of the relevant background art.

The extraction of sugar from sugar beets gives a by-product in the form of beet pulp, which can be used as stock feed. As a result of the severe cleanliness regulations that apply to the transportation of beet pulp from the sugar works to the animal breeders, as well as to the actual storage at the breeders', high demands are placed on the transport vehicles, the handling equipment and the storage tanks. The beet pulp must not come into contact with any impurities, such as earth, which would easily render it unfit as stock feed. If stored for a long time at the breeders', the beet pulp must not come into any contact with air.

With this in mind, a method has recently been developed in which a strand of beet pulp is compacted in an elongate plastic tube which is placed on the ground somewhere near the stables of the breeder. The tube, which may be up to about 70 m long and have a diameter of about 2.5 m, is closed at one end and can be opened at the other end where the pulp can be removed when required. Naturally, this end is carefully closed after each withdrawal of pulp, and the pulp in the tube is thus kept hermetically sealed off.

Such strands of compacted beet pulp in plastic tubes have hitherto been placed on the ground by means of a vehicle assembly made up of a conventional tractor and, connected thereto, a trailer carrying a container for the pulp. At the bottom of the container, there is provided a feeding screw connected to the power-take off of the tractor and adapted to feed the pulp out of the container and into the tube which is fastened on a special supporting collar at the rear of the trailer.

In operation, the beet pulp is first loaded in the container by means of a bucket crane mounted on a lorry placed beside the vehicle assembly. Then, the feeding screw is rotated by means of the power-take off of the tractor so that the pulp is fed into the tube, which is gradually filled and pulled out from the supporting collar. However, this requires the provision of some sort of counterforce equipment behind the tube.

In one such mobile compacting device (see, for instance, U.S. Pat. Nos. 4,949,633 and 4,724,876), the counterforce equipment is in the form of a separate grating or cage which is placed behind the tube before feeding begins and to which are attached two wires. The wires extend in the forward direction and are each wound round a winch drum. The winch drums are mounted one on each side of the trailer and further are provided with some sort of brake device. As the feeding screw operates and the pulp is pressed into the tube, the vehicle assembly is driven forward, which increases the tension in the wires and gives rise to a counterforce effect. Then, more wire is gradually released from the winch drums, and the vehicle assembly is driven forward and the strand laid out. Naturally, the driver of the tractor may also employ the regular brakes of the tractor to achieve a counterforce effect.

However, this prior-art device suffers from a number of drawbacks. The cage and its wires form a bulky and unwieldy structure which, after use, has to be folded and fastened to the trailer. Further, the two wires running on both sides of the laid-out tube may easily tear the plastic tube.

Another disadvantage is that the prior art described above usually requires two operators, one for driving the tractor and one for operating the crane. A further disadvantage is that the feeding screw is connected to the regular power take-off of the tractor, which severely restricts the possibilities of adjusting the degree of compacting, the braking effect and the counterforce effect.

One object of the present invention is, therefore, to obviate these disadvantages by providing a mobile device which is adapted for compacting feedstuff or the like in a tube and in which the need of separate counterforce equipment is much smaller, or does not exist at all, and which further requires a minimum of operators. A further object is that the tube laid on the ground should not be damaged by any wires or other loose equipment.

Another object of the invention is to obviate the above disadvantages by providing a method for compacting feedstuff or the like in a tube to be placed on the ground, without the need of any bulky and unwieldy counterforce equipment.

SUMMARY OF THE INVENTION

A mobile device compacts feedstuff in a tube which is placed on the ground as the mobile device is propelled. The device includes a traction vehicle, a trailer unit connected to the traction vehicle, a container for the feedstuff, and a rotatable feeding screw mounted at the rear of the trailer unit for feeding the feedstuff from the container into the tube where it is compacted. A hydraulic motor is connected to the feeding screw, and it is driven by hydraulic fluid at a pressure which is proportional to loading of the feeding screw due to compaction of the feedstuff. The device has a brake system for braking the wheels of the trailer unit to produce a braking force while the feedstuff is being fed into the tube.

The apparatus of the invention includes a control unit which is connected to the brake system. The control unit includes a transducer for sensing the hydraulic pressure at the motor, and it generates a signal which corresponds to the hydraulic pressure at the motor. The control system controls the brake system to reduce the braking force when the hydraulic pressure sensed rises to a predetermined maximum value, and it increases the braking force when the hydraulic pressure sensed decreases to a predetermined minimum value.

Preferably the brake system has a valve assembly; the signal from the control unit is an electric signal; and, the control unit includes a converter which converts the electric signal to a compressed air signal which controls a valve assembly in the brake system in order to control the braking force. The signal converter is provided with a compressed air pipe for carrying the compressed air signal, and a pressure regulator is provided for restricting pressure in the compressed air pipe of the signal converter.

According to the method of the invention the feeding screw is driven by the hydraulic motor, the pressure of the hydraulic fluid at the hydraulic motor is sensed, and a signal is generated corresponding to the hydraulic pressure. The braking of the wheels is controlled in response to this signal in order to exert a braking force. The braking force is reduced when the hydraulic pressure rises to a predetermined maximum value, and the braking force is increased when the hydraulic pressure decreases to a predetermined minimum value.

Preferably, the signal from the transducer is an electric signal, and this signal is converted into a compressed air signal which controls the braking force in response to changes of the load on the feeding screw.

BRIEF DESCRIPTION OF THE DRAWINGS

One embodiment of the invention will be described in more detail below, reference being had to the accompanying drawings, in which.

DESCRIPTION OF A PREFERRED EMBODIMENT

Figure 1:
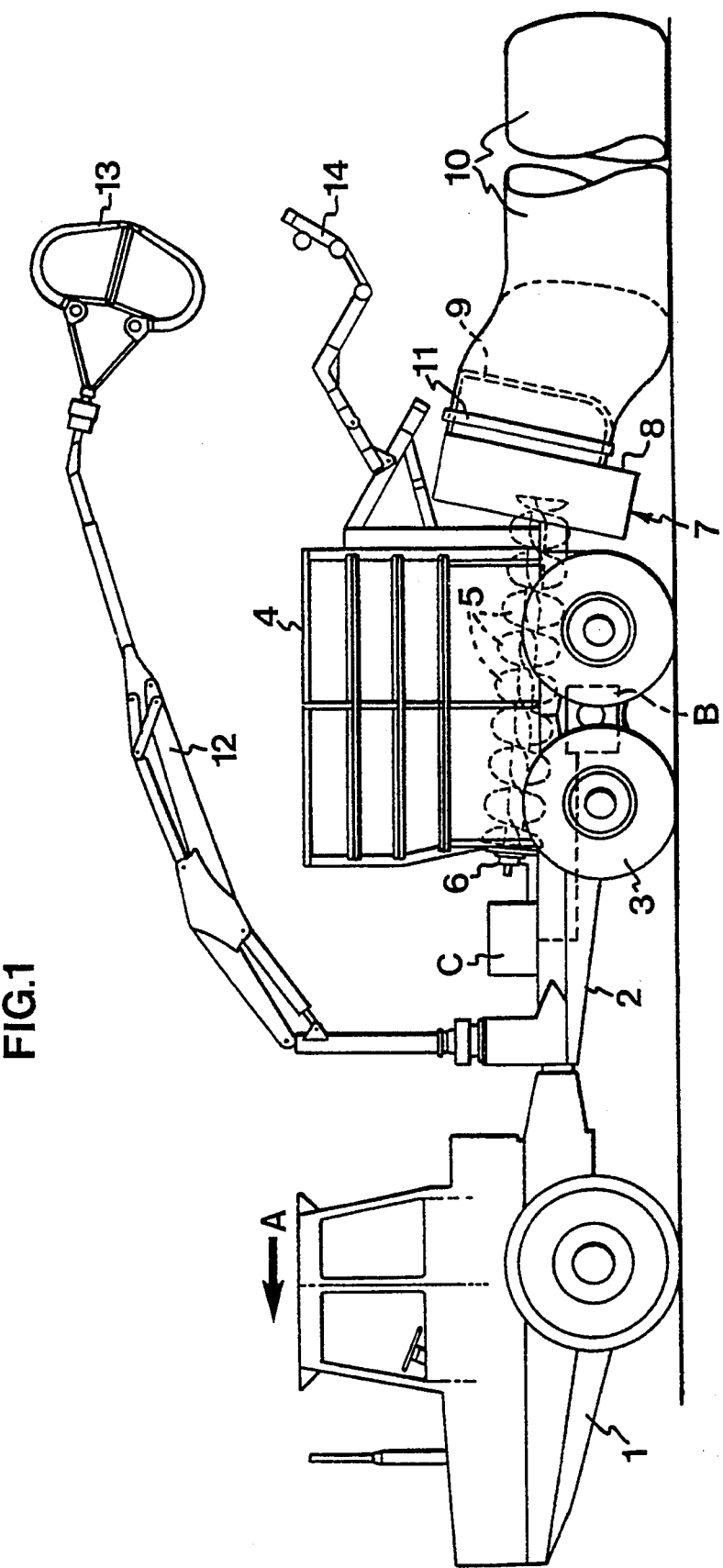
FIG. 1 is a schematic view of a mobile device according to the invention.
Figure 2:
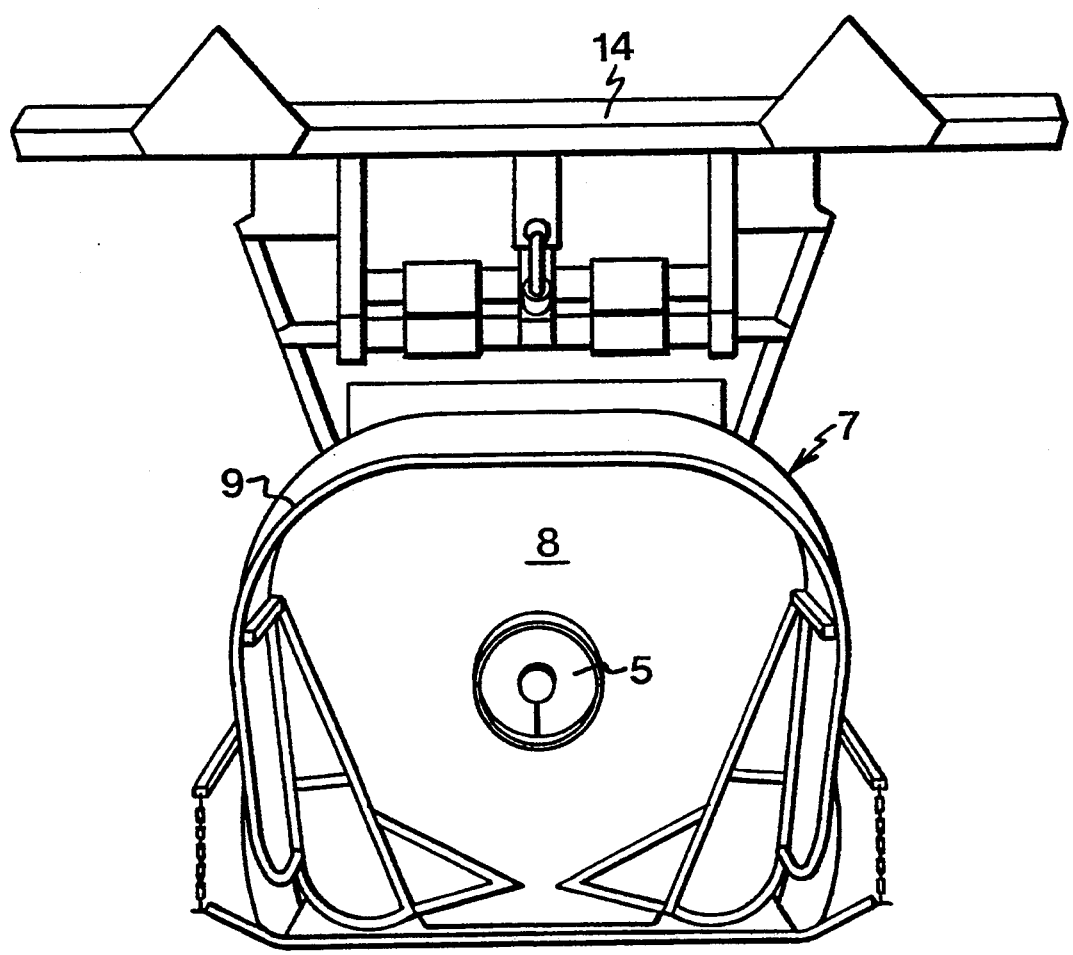
FIG. 2 is a rear view of a feeding-out unit associated with the device.

FIG. 1 illustrates a mobile device according to the invention, which comprises a traction vehicle 1 and, connected thereto, a trailer unit 2 with a bogie 3. The trailer unit 2 is equipped with a container or tank 4 for the feedstuff, e.g. beet pulp. A rotatable feeding screw 5 is mounted inside the tank 4, at the bottom thereof, and is, at one end, driven by a hydraulic motor 6. When the screw 5 operates, the feedstuff is fed out of the tank 4 and into a feeding-out unit 7 which consists of a compacting member 8 and a supporting collar 9. A plastic tube 10 is passed on the collar 9 and is preferably fixed at the opening by an elastic band 11. It is thus in the form of a strand that the feedstuff is pressed into the tube 10 by the screw 5. The feeding-out unit 7 is shown most clearly in FIG. 2, where the tube 10 has been left out and the feeding-out site of the screw 5 is clearly visible.

The trailer unit 2 further includes a crane 12 with a bucket 13 which, when not in operation, is housed in a holder 14. Since the crane 12 is mounted on the trailer unit 2, the driver of the tractor may himself load the feedstuff into the tank 4, and the entire vehicle assembly 1, 2 may thus be operated by one man.

In operation, the feeding screw 5 is rotated and the feedstuff is fed out of the tank 4 and is compacted in the compacting member 8. The tube 10 is gradually filled with feedstuff. In particular the preliminary compacting of the feedstuff in the tube 10 requires some sort of counterforce equipment which hitherto has been in the form of a cage, as discussed by way of introduction. However, the invention presents a different and ingenious solution to this problem, involving the use of a control unit C which is mounted on the trailer unit 2 and to which is connected a brake system B for braking the wheels of the bogie 3. The braking of the bogie wheels achieves the desired counterforce effect when the feedstuff is fed into the tube 10 for compaction, as will be described in more detail below.

Figure 3:
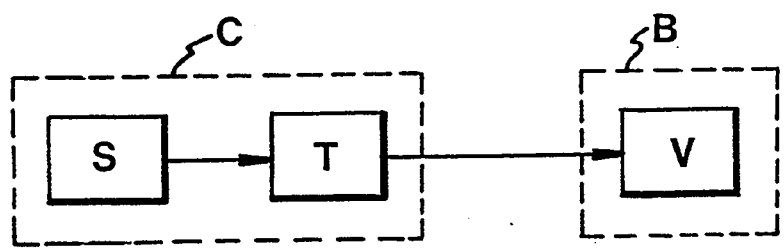
FIG. 3 is a much simplified schematic view of a control unit forming part of the device and a brake system connected to the control unit.

As mentioned earlier, the feeding screw 5 is driven by the hydraulic motor 6 which is associated to a transducer S forming part of the control unit C (see FIG. 3). The transducer S senses the hydraulic pressure of the motor 6, which is proportionate to the load on the feeding screw 5 and, consequently, to the degree of compacting at the feeding-out site, i.e. in the compacting member 8. The transducer S generates an electric signal corresponding to the sensed hydraulic pressure and transmitted to a converter T which converts it to a compressed-air signal for controlling a valve assembly V which forms part of the brake system B and which in turn controls the braking effect according to the load on the feeding screw 5 and, consequently, the counterforce effect. The valve assembly V simply operates the braking mechanism of the bogie 3.

The signals generated in the control unit C serve to control the braking of the bogie 3 in such a manner that the braking effect is wholly or partly cancelled when the hydraulic pressure reaches a predetermined maximum value and is wholly or partly applied when the hydraulic pressure reaches a predetermined minimum value. The braking effect is thus cancelled and applied within a given range for the hydraulic pressure. It will be appreciated that it is the counterforce effect which is of the greatest significance during the preliminary compacting of the feedstuff in the tube 10 (indicated by broken lines in FIG. 1).

In operation, the entire vehicle assembly 1, 2 is moved in the direction indicated by the arrow A while the tube 10 is placed on the ground. As soon as the tube 10 has reached a certain length, for instance one meter or so or more, and thus has become heavy enough, the assembly 1, 2 is propelled more or less by itself. The desired degree of compacting is easily preprogrammed by setting a suitable range for the hydraulic pressure. When using a tube with a diameter of about 2.5 m, a suitable degree of compacting is about 3.5–4 tons/m. Such a tube should conveniently be about 70 m long.

In tests, the mobile compacting device according to the invention has given excellent results, not least since it is so easily operated. One person can thus operate the entire assembly 1, 2, and there is no need of any separate and unwieldy counterforce equipment that might damage the tube 10. Owing to the control unit C and the brake system B connected thereto, the assembly 1, 2 can be propelled at a steady pace as the tube 10 is placed on the ground behind.

Figure 4:
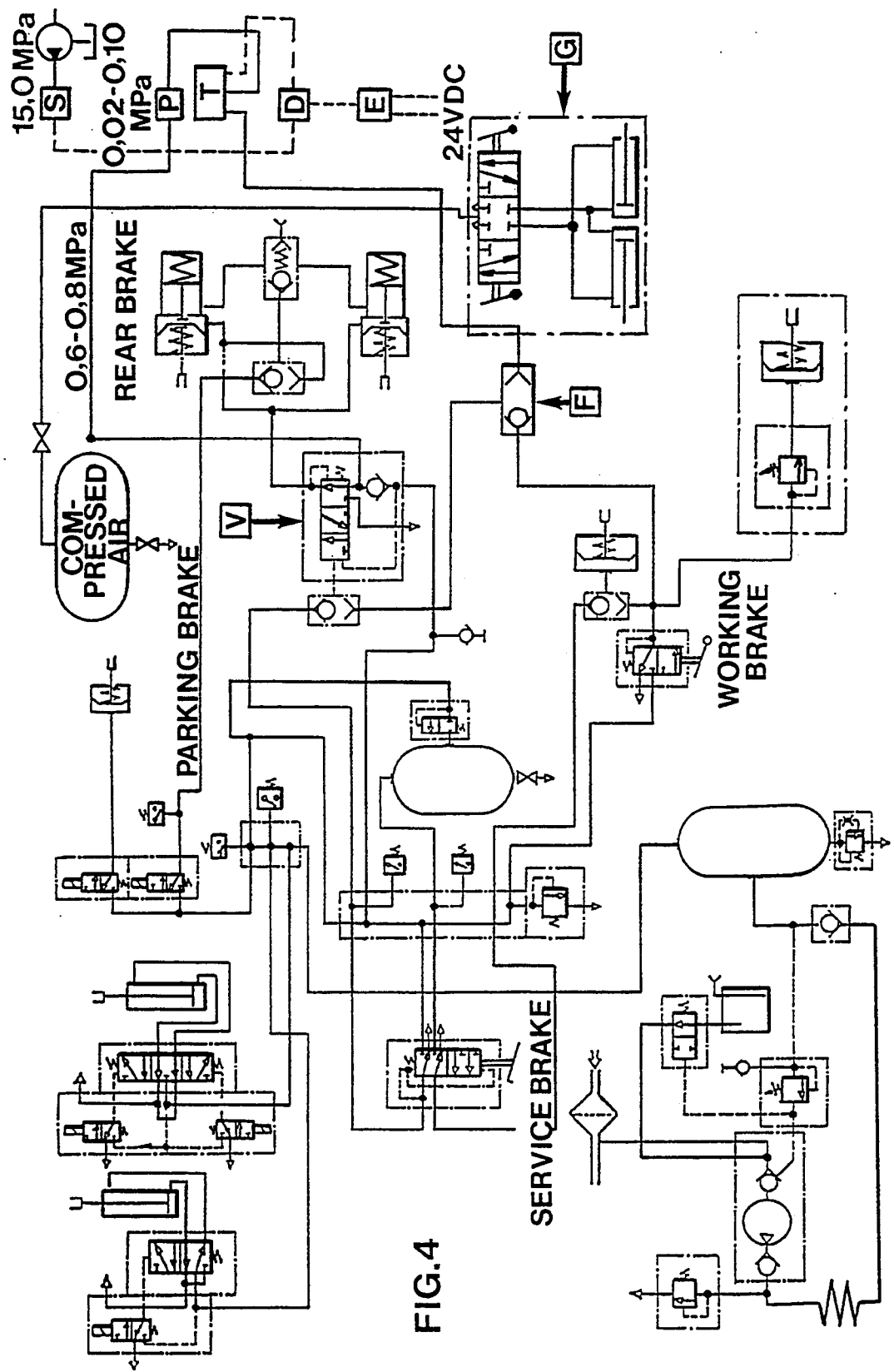
FIG. 4 illustrates the control and brake circuits in more detail.

FIG. 4 is a diagram showing the control and brake circuits employed in the control unit C with associated brake system B that forms part of a currently preferred embodiment of the device according to the invention.

The transducer S obtains from the hydraulic motor 6 a hydraulic pressure which it senses and which, at the most, amounts to 15.0 MPa. The transducer S transmits an electric output signal (broken line) which, via a switch box D, is further transmitted to the converter T where it is converted to a compressed-air signal which, via a distributing valve F, is transmitted to the valve assembly V in the brake system B. A regulator E, which is connected to a current source marked 24 V DC, is also connected to the signal converter T via the switch box D. These connections thus are electric ones.

Further, another pressure regulator P is connected to the signal converter T. The pressure regulator P is supplied with compressed air via a feeder pipe from a compressed-air tank. The pressure in the pipe is about 0.6–0.8 MPa. Compressed air of such a high pressure cannot be directly conducted to the signal converter T, which is why the pressure regulator P is connected between the compressed-air tank and the signal converter T. Thus, the pressure regulator P is designed to restrict the pressure in the compressed-air pipe of the signal converter T. The pressure is preferably restricted by the pressure regulator P to a value in the range of 0.02–0.10 MPa. The pressure regulator P is used for setting, inter alia, the secondary pressure required to make the signal converter T transmit a suitable compressed-air signal acting on the rear brakes. For the sake of completeness, the diagram further includes a tube holder G having a valve which controls piston-cylinder units for securing and releasing, respectively, the tube 10.

The above components shown in FIG. 4 can, with the exception of the tube holder G, be said to form part of a brake controlling the rear brakes of the vehicle assembly 1, 2 in such a manner that a certain degree of compacting is continuously upheld in the tube 10 (e.g. 3–4 tons of feedstuff per meter of the tube). The compacting must be suitably controlled to suit the different ground conditions (slope, slippery ground, etc). The regulating brake then controls the compressed air supplied to the rear brakes in such a manner that the brakes are alternately acted upon or not acted upon. The control brake operates independently of the other brake systems of the vehicle assembly 1, 2, i.e. the service brake, the working brake and the parking brake.

It goes without saying that the invention is by no means restricted to the embodiment described above, and several modifications are thus conceivable within the scope of the appended claims. It should be observed that the concept of the invention can be applied to many types of material, such as beet pulp, grass pulp, maize pulp and ensilage. It should further be emphasised that the schematically described control unit, as well as the brake system, may include further components and lines which, however, have not been described here for the sake of clarity. Moreover, the vehicle assembly itself may be of other design; both the traction vehicle and the trailer unit may, for instance, be mounted on tracks instead of wheels. The controlled braking effect on the trailer unit according to the invention is, of course, equally applicable whether the trailer unit is mounted on tracks or wheels. Further, the vehicle assembly may also consist of a single self-propelled unit.

I claim:

1. A mobile device for compacting feedstuff in a tube (10) which is placed on the ground as the mobile device is propelled, said device comprising a traction vehicle (1), a trailer unit (2) which is mounted on wheels and is connected to said traction vehicle, a container (4) for the feedstuff, and a rotatable feeding screw (T) mounted at the rear of the trailer unit (2) for feeding the feedstuff from the container (4) into said tube (10) where it is compacted,
   a hydraulic motor (6) connected to the feeding screw and driven by hydraulic fluid at a pressure which is proportional to loading of the feeding screw due to compaction of feedstuff thereby, a control unit (C), a brake system (B) connected to the control unit for braking the wheels (3) of the trailer unit (2) to produce a braking force while the feedstuff is being fed into the tube (10), said control unit (C) including a transducer (S) for sensing the hydraulic pressure at the motor (6); said control unit generating a signal which corresponds to the hydraulic pressure at the motor to control the brake system to reduce the braking force when the hydraulic pressure sensed rises to a predetermined maximum value, and to increase the braking force when the hydraulic pressure sensed decreases to a predetermined minimum value.

2. The device of claim 1, wherein said brake system has a valve assembly, and said signal is an electric signal, said control unit (C) including a converter (T) which converts the electric signal to a compressed air signal which controls said valve assembly (V) to control the braking force.

3. The device of claim 2 wherein the signal converter (T) has a compressed air pipe for carrying said compressed air signal, and a pressure regulator (P) for restricting pressure in the compressed air pipe of the signal converter (T).

4. Method for compacting feedstuff in a tube (10) which is placed on the ground, said method being performed with a mobile device which includes a traction vehicle (1), a trailer unit (2) mounted on wheels and connected to the traction vehicle, a container (4) for the feedstuff, and a rotatable feeding screw (5) for feeding said feedstuff from the container (4) into said tube (10) as the mobile device is propelled,
   said method being performed by driving the feeding screw (5) with a hydraulic motor (6) which is supplied with hydraulic fluid under pressure, sensing the pressure of the hydraulic fluid at the hydraulic motor, said pressure being proportional to loading of the feeding screw due to compaction of the feedstuff, generating a signal corresponding to the hydraulic pressure, controlling the braking of the wheels in response to said signal to exert a braking force, reducing the braking force when the hydraulic pressure rises to a predetermined maximum value, and increasing the braking force when the hydraulic pressure decreases to a predetermined minimum value.

5. The method of claim 4, wherein said signal is generated in the form of an electric signal, and converting said electric signal to a compressed air signal which controls the braking force in response to changes of the load on the feeding screw.

* * * * *